(12) United States Patent
Rajagopal et al.

(10) Patent No.: US 8,297,666 B2
(45) Date of Patent: Oct. 30, 2012

(54) BATTERY COVER AND LATCH ASSEMBLY FOR A PORTABLE ELECTRONIC DEVICE

(75) Inventors: Vijai Rajagopal, Gujrat (IN); James Carl Infanti, Waterloo (CA); Timothy Herbert Kyowski, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 594 days.

(21) Appl. No.: 12/413,264

(22) Filed: Mar. 27, 2009

(65) Prior Publication Data
US 2010/0244464 A1    Sep. 30, 2010

(51) Int. Cl.
*E05C 1/08* (2006.01)
*E05C 1/02* (2006.01)

(52) U.S. Cl. ........... 292/163; 292/137; 292/DIG. 11; 292/DIG. 63

(58) Field of Classification Search .......... 292/137, 292/163, DIG. 11, DIG. 63
See application file for complete search history.

(56) References Cited

U.S. PATENT DOCUMENTS

| 5,028,083 | A | * | 7/1991 | Mischenko | 292/175 |
| 5,213,913 | A | | 5/1993 | Anthony | |
| 5,224,018 | A | * | 6/1993 | Kobayashi | 361/679.37 |
| 5,287,245 | A | * | 2/1994 | Lucente et al. | 361/679.17 |
| 5,314,763 | A | | 5/1994 | Aksoy et al. | |
| 5,460,906 | A | | 10/1995 | Leon et al. | |
| 5,465,191 | A | * | 11/1995 | Nomura et al. | 361/679.27 |
| 5,535,437 | A | * | 7/1996 | Karl et al. | 455/575.1 |
| 5,607,792 | A | | 3/1997 | Garcia et al. | |
| 5,671,958 | A | * | 9/1997 | Szapucki et al. | 292/175 |
| 5,895,729 | A | | 4/1999 | Phelps, III et al. | |
| 6,134,116 | A | * | 10/2000 | Hoss et al. | 361/747 |
| 6,168,881 | B1 | | 1/2001 | Fischer | |
| 6,371,535 | B2 | * | 4/2002 | Wei et al. | 292/175 |
| 6,730,432 | B1 | | 5/2004 | Grosfeld et al. | |
| 6,808,842 | B2 | | 10/2004 | Siddiqui et al. | |
| 7,181,238 | B2 | * | 2/2007 | Chiang | 455/556.1 |
| 7,419,742 | B2 | | 9/2008 | Liu et al. | |
| 7,447,013 | B2 | * | 11/2008 | Shi et al. | 361/679.33 |
| 7,520,541 | B1 | * | 4/2009 | Lawrence | 292/175 |
| 7,924,553 | B2 | * | 4/2011 | Lev et al. | 361/679.06 |

(Continued)

FOREIGN PATENT DOCUMENTS

EP    0986232 A2    3/2000

(Continued)

OTHER PUBLICATIONS

European Search Report; EP 09 15 6523; Aug. 26, 2009.

*Primary Examiner* — Carlos Lugo
(74) *Attorney, Agent, or Firm* — Quarles & Brady LLP; George E. Haas

(57) ABSTRACT

An apparatus for securing a cover over an opening defined in a housing of a portable electronic device includes a pair of latches along opposite edges of the cover. Each latch assembly has a cap affixed to the cover and partially housing a latch that is slideable therein. Each latch is biased by a separate spring into a first position, at which a tab on that latch projects from the cap and engages the housing. An actuator on each latch extends outside the respective cap for engagement by a user to slide the latch into a second position in which the associated tab is retracted from engaging the housing.

22 Claims, 3 Drawing Sheets

U.S. PATENT DOCUMENTS

| | | |
|---|---|---|
| 2004/0192106 A1 | 9/2004 | Britz |
| 2004/0203518 A1 | 10/2004 | Zheng |
| 2005/0221654 A1 | 10/2005 | Phillips et al. |
| 2006/0292439 A1 | 12/2006 | Zuo |
| 2007/0010219 A1 | 1/2007 | Qin et al. |
| 2007/0087263 A1 | 4/2007 | Ge et al. |
| 2007/0218961 A1 | 9/2007 | Luo |
| 2008/0193837 A1 | 8/2008 | Lu |
| 2008/0268329 A1 | 10/2008 | Mackle et al. |
| 2008/0318646 A1 | 12/2008 | Lin |

FOREIGN PATENT DOCUMENTS

| | | |
|---|---|---|
| EP | 1463275 A1 | 9/2004 |
| WO | 00/08698 | 2/2000 |

* cited by examiner

BATTERY COVER AND LATCH ASSEMBLY FOR A PORTABLE ELECTRONIC DEVICE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE DISCLOSURE

1. Field of the Disclosure

The present disclosure relates to portable electronic devices, including, but not limited, to handheld wireless communication devices; and more particularly to a cover by which a user gains access to a battery compartment in such a device.

2. Description of the Related Art

Certain portable electronic devices, handheld wireless communication devices in particular, are battery powered. The device typically has a metal or plastic housing defining a compartment for the battery. A cover releasably engages the housing to enable the user to access the battery for replacement. In conventional devices, the cover is generally closed by sliding it along a recessed opening of the battery compartment. As that sliding occurs, hook shaped tabs on the cover engage apertures in the housing and then travel into smaller sections of the apertures in which the hooks are captivated. Such captivation holds the cover on the housing.

Sliding the cover in the opposite direction moves the hooks into the larger sections of the apertures enabling the cover to be moved away from the housing. In that manner, the cover can be removed to open the battery compartment.

Because the cover must be secured tightly to the housing, some users find it physically challenging to slide the cover of conventional devices off and on the housing.

DETAILED DESCRIPTION

A portable electronic device has a housing with a battery compartment that is closed by a cover. The cover has at least one and preferably two spring-loaded latch assemblies that are slideably located along opposite edges of the cover. In the normal positions, tabs on the latch assemblies extend under receiving surfaces on the housing to hold the cover in place. The user is able to simultaneously slide the two latch assemblies from their normal positions and thereby retract the tabs from engagement with the receiving surfaces. This permits the cover to be pivoted outward and removed from the housing, thereby exposing the battery compartment.

Figure 1:
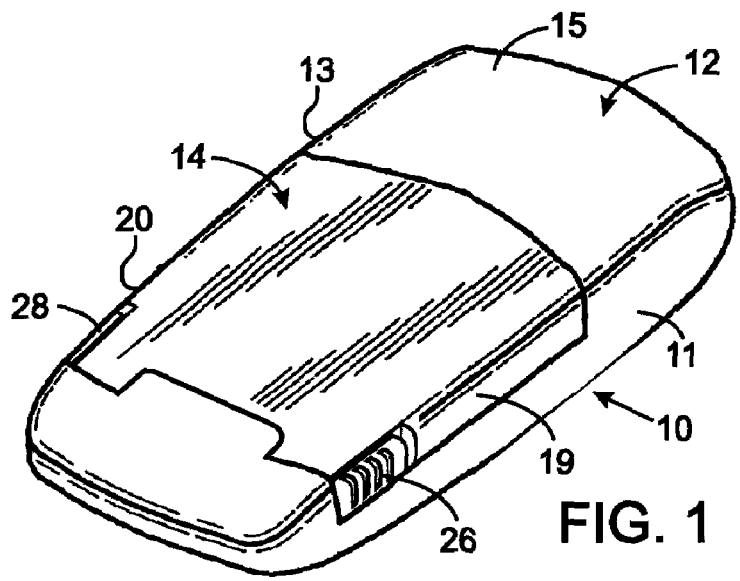
FIG. 1 is a perspective view of a rear side of a portable electronic device showing the cover over a battery compartment defined in a housing.

With initial reference to FIG. 1, a portable electronic device 10 is provided, such as a handheld wireless communication device, and includes a housing 12 with a cover 14. The cover 14 preferably is made of metal, while the housing may be either metal or molded plastic, although it is contemplated that alternative materials with similar properties may be appropriate. The cover 14 is removably secured over a battery compartment or opening 23 (FIG. 5) defined in the housing 12. Specifically the cover 14 fits into a recess 45 defined in the housing 12 that surrounds the battery compartment, thus when in place, the cover is flush with the exterior surfaces of the housing. The cover extends across a rear surface 15 of the housing wrapping around onto two side surfaces 11 and 13. First and second latch assemblies 26 and 28 are slideably located along opposite edges of the cover 14 and engage the housing to secure the cover in place.

Figure 2:
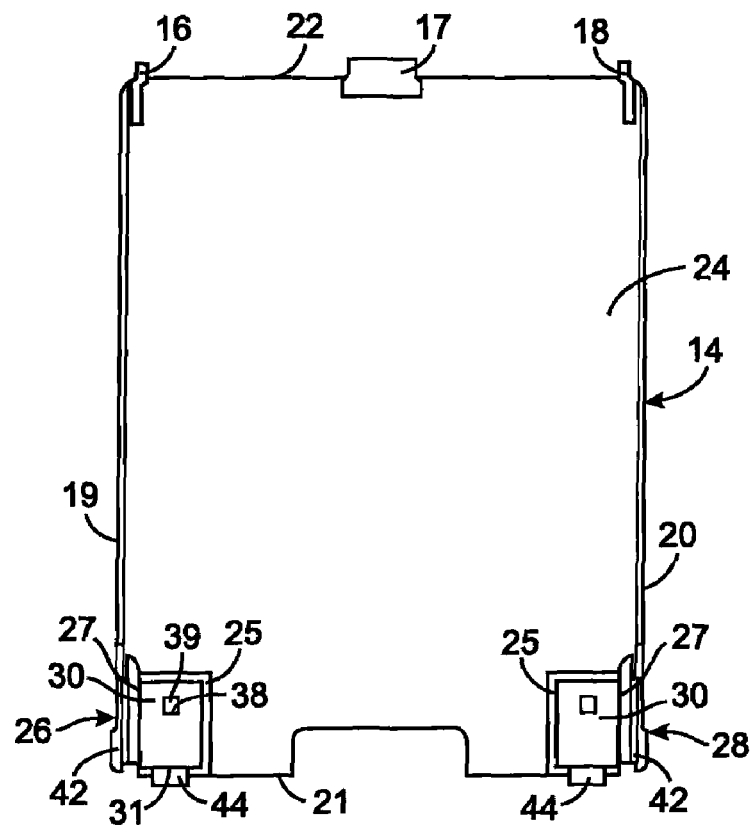
FIG. 2 illustrates the inside major surface of the cover showing latch assemblies for holding the cover on the housing.

With additional reference to FIG. 2, the cover 14 has first and second edges 19 and 20 spaced apart and extending along the length of the cover. Third and fourth edges 21 and 22 extend between the first and second edges 19 and 20 on opposite sides of the cover. A set of three fixed tabs 16, 17 and 18 project from the fourth edge 22 which extends across the width of the housing 12 when the cover is in place. The first and third fixed tabs 16 and 18 are adjacent the first and second edges 19 and 20 of the cover 14 and the second fixed tab 17 is located substantially at the middle of the fourth edge 22, although it is appreciated that the tabs 16-18 are not limited to the above-described orientation. The fixed tabs 16-18 project outward from the cover's major inside surface 24 and engage corresponding receptacles (not shown) defined in the housing 12 to hold the fourth edge 22 in place. A lesser or greater number of fixed tabs may be provided as required to hold the fourth edge in place.

A releasable first latch assembly 26 is located on the inside surface 24 of the cover 14 along the first edge 19 at a corner with the third edge 21. A releasable second latch assembly 28 is similarly located along the second edge 20 at an opposing corner with the third edge 21. As will be described, these latch assemblies 26, 28 also engage the housing 12 to hold the cover 14 in place. Each of the first and second latch assemblies 26 and 28 can be manually operated to disengage the housing 12 and enable removal of the cover 14.

Each latch assembly 26 and 28 has a cap 30 which is bonded to the inside surface 24 of the cover 14 by a suitable means, such as welding or an adhesive. Although alternative configurations may be appropriate, the cap 30 is preferably a rectangular polyhedron with a first open side 29 (FIG. 4) against the inside cover surface 24 and a second open side 27 facing the respective cover edge. Other sides of the cap 30 define apertures into which other components of the latch assembly extend, as will be described. The cap 30 has a flange 25 extending around the first open side and abutting the inside cover surface 24 to aid in fastening those components together.

Figure 3:
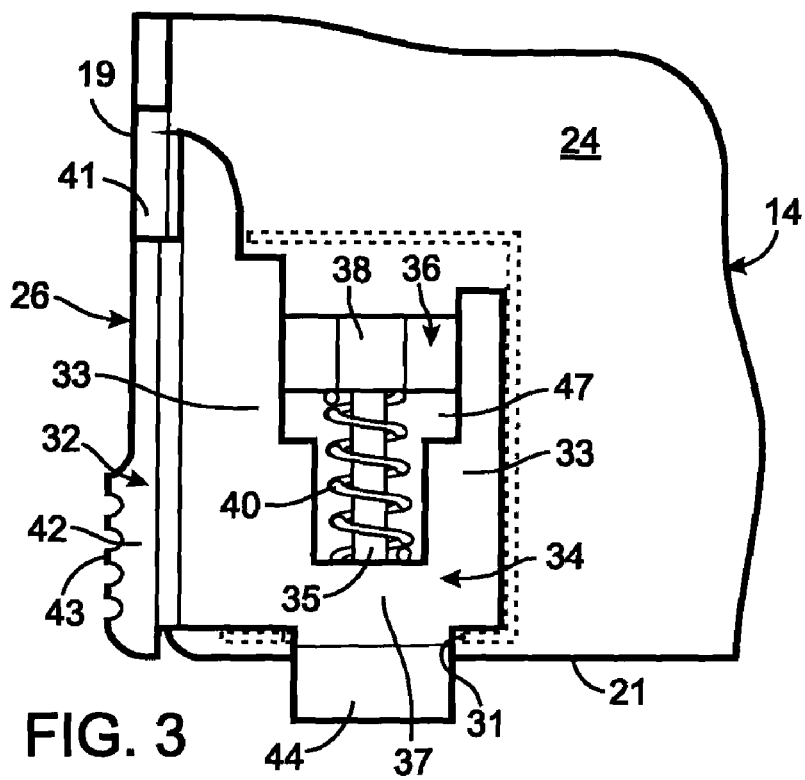
FIG. 3 is an enlarged view of one of the latch assemblies with a cap removed.

The first and second latch assemblies 26 and 28 have identical construction, but are mirror images of each other. Therefore, the details of the first latch assembly 26 will be described with the understanding that the description applies equally as well to the second latch assembly 28. FIG. 3 illustrates details of the first latch assembly 26 with the cap 30 removed, however the outline of a cap wall is depicted by a dashed line. The first latch assembly 26 comprises a movable latch 32 that is slideably received within the cap 30 so as to move against the inside surface 24 of the cover 14. When in place, the cap guides the sliding motion of the latch 32. The latch 32 has a U-shaped central portion 34 formed by a pair of parallel legs 33 with a cross leg 37 there between and facing the fourth cover edge 22. A guide pin 35 extends from the cross leg 37 and through an open interior 47 of the U-shaped central portion 34. The guide pin 35 is slideably received in a guide aperture 49 (FIG. 4) defined in a stop block 36 located within the open interior. One surface of the stop block 36 has a boss 38, that in the assembled latch assembly projects into a first aperture 39 in the cap 30 (see FIG. 2). This engagement locates the stop block 36 which is fastened by welding, adhesive, or similar means to the inside surface of the cap 30 thereby holding the stop block in a fixed position as the latch 32 slides. The guide pin 35 extends through a coil-type, compression spring 40, that abuts the latch cross leg 37 and the stop block 36. The spring 40 biases the latch 32 away from the stop block 36, thereby providing a force that pushes the latch 32 toward the third edge 21 of the cover 14 and against an adjacent side wall of the cap 30. In this position, a tab 44, projecting from the latch's central portion 34, extends outward through a second aperture 31 defined in the wall of the cap 30 that faces the third edge 21 (see also FIG. 2).

The latch 32 further includes a manual actuator 42 that is contiguous with one leg 33 of the central portion 34 and projects through the second open side 27 of the cap 30 and through a notch 41 defined in the first edge 19 of the cover 14. The manual actuator 42 has a surface 43 for the finger of a person to engage. Preferably, the surface 43 includes texture such as ridges or ribbing, enabling the user to easily operate the actuator 42. This enables the person using the portable electronic device 10 to apply force to the manual actuator 42 that causes the latch 32 to slide along the cover's inside surface 24 against the bias force of spring 40 and away from the cover's third edge 21.

Figure 4:
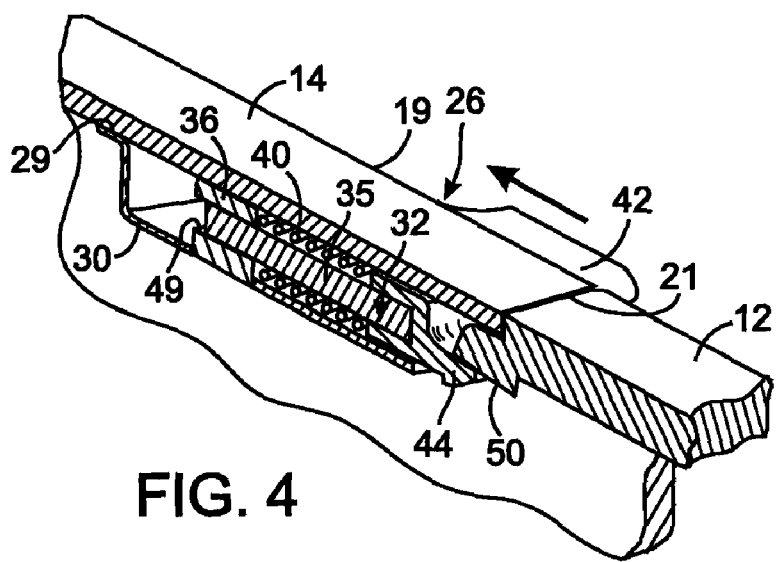
FIG. 4 is a partial cross sectional view depicting engagement of a latch assembly with the housing.
Figure 5:
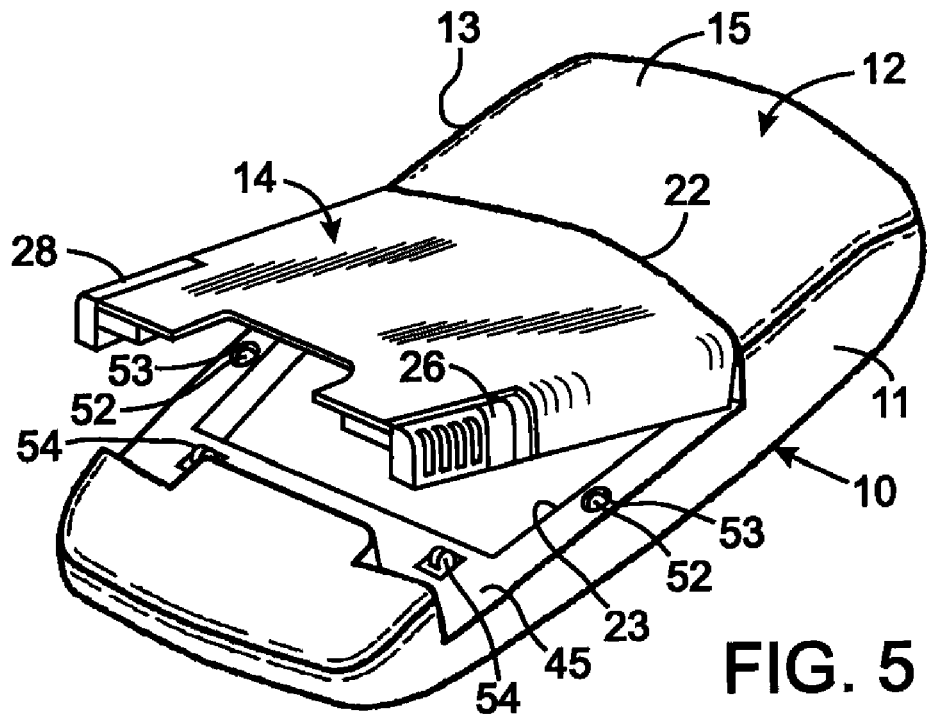
FIG. 5 shows the cover partially removed from the housing.

The above-described sliding motion releases the latch 32 from engagement with the housing 12 of the portable electronic device 10 and enables removal of the cover 14. Referring to FIG. 4, when the cover 14 is secured in place on the housing 12, the spring 40 biases the latch 32 into a first position at which the tab 44 slides under and into engagement with a catch surface 50 on the interior of the housing. Both the catch surface 50 and a mating surface on the tab 44 are similarly tapered to provide tight engagement between those two components when the latch 32 is so biased. Those tapered surfaces also minimize friction when the tab 44 moves out of engagement with the catch surface 50. When a user of the portable electronic device applies a finger to the actuator 42 and slides the latch along the first cover edge 19 toward the upper left as indicated by the arrow in FIG. 4, the tab 44 is retracted into the cap 30 and disengages the catch surface 50. In this second position of both latches 32, the cover 14 can be pivoted upward and away from the recess in the housing 12, as shown in FIG. 5. From the pivoted position, the cover 14 can be pulled completed out of the recess 45 of the housing, and the battery (not shown), can be removed from the battery compartment 23. The first and second latch assemblies 26 and 28 consume minimal volume inside the cover as compared to other latch designs.

With continuing reference to FIG. 5, the housing 12 further includes a pair of spring-loaded pogo pins 52 located in apertures 53 on opposite sides of the housing recess 45. The pogo pins 52 are electrically conductive and provide connections between a conductive portion of the housing 12 and either the metal cover 14 or an electrically conductive material applied to the interior surface of a plastic cover. The housing 12 also includes two ground springs 54 protruding through apertures in a wall 59 within the housing recess 45 to engage the inside surface of the cover 14 when the cover is fastened in place.

Figure 6:
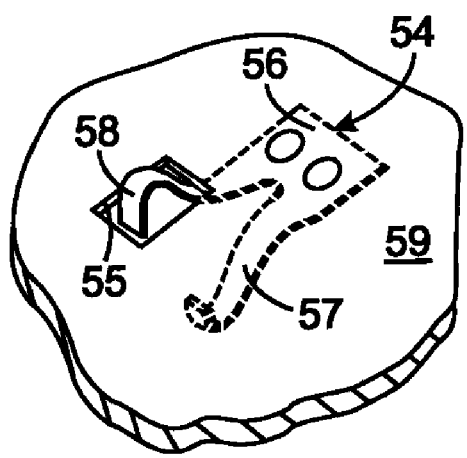
FIG. 6 illustrates details of a ground spring on the housing in FIG. 5.

FIG. 6 depicts the details of each ground spring 54 which comprises a base portion 56 that is secured to an interior surface of the housing recess 45 and from which project first and second leaf arms 57 and 58. The first leaf arm 57 projects downward into the interior of the housing recess 45 for engagement by a ground conductor on a printed circuit board or other component of the portable electronic device (not shown). The second leaf arm 58 projects upward through an opening 55 in the housing recess 45 so as to engage the interior surface of the cover 14 when secured on the housing.

The ground spring 54 provides an electrical path between the ground conductor on the printed circuit board and the cover 14. Each pogo pin 52 and each ground spring 54 functions as an electrical contact that engages the cover 14 upon being secured to the housing 12 and provides an electrical connection between the housing 12 and the cover for electrical shielding purposes. The pogo pins 52 and ground springs 54 also aid in pivoting the cover 14 away from the housing 12 when the latch assemblies 26 and 28 are released, thereby assisting in the removal of the cover. Therefore, the pogo pins and each ground springs still could be used for a cover that was not electrically conductive.

The foregoing description was primarily directed to a preferred embodiment of the present latch assembly. Although some attention was given to various alternatives within the scope of the disclosure, it is anticipated that one skilled in the art will likely realize additional alternatives that are now apparent from disclosure of embodiments of the present latch assembly. Accordingly, the scope of the disclosure should be determined from the following claims and not limited by the above disclosure.

The invention claimed is:

1. An apparatus for securing a cover over an opening defined in a housing of a portable electronic device, wherein the cover has non-collinear first and second edges between which third and fourth edges extend, said apparatus comprising:
   a first latch assembly affixed to the cover and having a first latch that is moveable along the first edge into and out of engagement with the housing, and a first biasing member arranged to bias the first latch into engagement with the housing; and
   a second latch assembly affixed to the cover and having a second latch that is moveable along the second edge into and out of engagement with the housing, and a second biasing member arranged to bias the second latch into engagement with the housing;
   wherein each of the first and second latches comprises: a U-shaped central portion having a pair of spaced apart legs with a cross leg extending there between, a stop block attached to the cover and located between the pair of spaced apart legs, the stop block having an aperture therein, a guide pin projecting from the cross leg, between the pair of spaced apart legs and into the aperture in the stop block, wherein the stop block guides the pin as the respective one of the first and second latches moves, and a tab projecting from the cross leg for engaging a respective catch on the housing.

2. The apparatus as recited in claim 1 further comprising a first cap secured to the cover and partially enclosing the first latch assembly; and a second cap secured to the cover and partially enclosing the second latch assembly.

3. The apparatus as recited in claim 2 wherein the first biasing member comprises a first spring biasing the first latch outward from the first cap; and the second biasing member comprises a second spring biasing the second latch outward from the second cap.

4. The apparatus as recited in claim 2 wherein in each of the first and second latch assemblies further comprises a stop block abutting the respective compression spring; and a cap secured to the cover and having the stop block affixed thereto.

5. The apparatus as recited in claim 1 wherein the tab of each of the first and second latches projects toward the third edge.

6. The apparatus as recited in claim 1 wherein each of the first and second latches comprises a user actuator projecting from the U-shaped central portion toward the first or second edge along which the respective latch is moveable.

7. The apparatus as recited in claim 1 wherein each of the first and second biasing members comprises a compression spring through which extends the respective guide pin, wherein the compression spring abuts the stop block of the respective one of the first and second latches.

8. The apparatus as recited in claim 1 wherein each of the first and second latches comprises a user actuator accessible from outside the portable electronic device for moving the latches out of engagement with the housing.

9. The apparatus as recited in claim 1 further comprising a fixed tab secured to the cover for engaging a receptacle on the housing.

10. The apparatus as recited in claim 9 further comprising a spring biased electrical contact on the housing and engaging the cover that is secured to the housing, the spring biased electrical contact being adapted to provide an electrical path between the cover and the housing and to cause the cover to move away from the housing when the first latch and second latch are out of engagement with the housing.

11. The apparatus as recited in claim 1 wherein the first latch is adapted to move out of engagement with the housing by moving in a first direction along the first edge, and the second latch is adapted to move out of engagement with the housing by moving in the first direction along the second edge.

12. An apparatus for securing a cover over an opening defined in a housing of a portable electronic device, wherein the cover has first and second opposing edges and third and fourth edges at least one of which extends from the first edge to the second edge, and the housing has first and second catches, said apparatus comprising:
a first latch assembly affixed to the cover and having a first latch that is slideable along the first edge into and out of engagement with the first catch, wherein the first latch has a first actuator accessible from an exterior of the housing by a user and configured for moving the first latch, and a first biasing member arranged to bias the first latch into engagement with the first catch;
a second latch assembly affixed to the cover and having a second latch that is slideable along the second edge into and out of engagement with the second catch, wherein the second latch has a second actuator accessible from an exterior of the housing by the user and configured for moving the first latch, and a second biasing member arranged to bias the second latch into engagement with the second catch; and
a spring biased electrical contact on the housing and engaging the cover that is secured to the housing, the spring biased electrical contact being adapted to provide an electrical path between the cover and the housing and to cause the cover to move away from the housing when the first latch and second latch are out of engagement with the housing.

13. The apparatus as recited in claim 12 further comprising a first cap secured to the cover and partially enclosing the first latch assembly; and a second cap secured to the cover and partially enclosing the second latch assembly.

14. The apparatus as recited in claim 13 wherein the first biasing member comprises a first spring biasing the first latch outward from the first cap; and the second biasing member comprises a second spring biasing the second latch outward from the second cap.

15. The apparatus as recited in claim 12 further comprising a fixed tab secured to the cover and projecting outward from the fourth edge for engaging a receptacle on the housing.

16. The apparatus as recited in claim 12 wherein the first and second edges are non-collinear.

17. The apparatus as recited in claim 12 wherein the first latch is adapted to move out of engagement with the first catch by sliding in a first direction along the first edge, and the second latch is adapted to move out of engagement with the second catch by sliding in the first direction along the second edge.

18. The apparatus as recited in claim 12 wherein each of the first and second latches comprises: a U-shaped central portion having a pair of spaced apart legs with a cross leg extending there between, a guide pin projecting from the cross leg and projecting between the pair of spaced apart legs, and a tab projecting from the cross leg for engaging one of the first and second catches on the housing.

19. The apparatus as recited in claim 18 wherein the first and second biasing members each comprises a compression spring through which extends the guide pin of the respective one of the first and second latches.

20. The apparatus as recited in claim 19 wherein each of the first and second latch assemblies further comprises a stop block attached to the cover and located between the spaced apart leg, and the stop block abutting the respective compression spring.

21. An apparatus for securing a cover over an opening defined in a housing of a portable electronic device, wherein the cover has an inside surface and non-collinear first and second edges extending away from the inside surface, said apparatus comprising:
a first latch assembly affixed to the cover and having a first latch that is moveable along the first edge into and out of engagement with the housing, and a first biasing member arranged to bias the first latch into engagement with the housing; and
a second latch assembly affixed to the cover and having a second latch that is moveable along the second edge into and out of engagement with the housing, and a second biasing member arranged to bias the second latch into engagement with the housing;
wherein each of the first and second latches comprises a central portion that slideably abuts the inside surface of the cover and that is U-shaped with a pair of spaced apart legs between which a cross leg extends, each of the first and second latch assemblies further comprises a stop block attached to the cover, located between the spaced apart legs, and having an aperture therein, and comprises a guide pin projecting from the cross leg between the pair of spaced apart legs and into the aperture in the stop block, wherein the stop block guides the pin as the respective one of the first and second latches moves, and each of the first and second latch assemblies further comprises a manual actuator projecting through an aperture in one of the first and second edges, and a tab for projecting outward from a third edge into engagement with the housing.

22. The apparatus as recited in claim 21 wherein each of the first and second biasing members comprises a compression spring abutting the respective stop block and through which the respective guide pin extends.

* * * * *